United States Patent
Brittin et al.

(10) Patent No.: US 6,209,256 B1
(45) Date of Patent: Apr. 3, 2001

(54) INSECT TRAP HAVING AN ATTRACTANT GAS EMITTED THROUGH A TRAPPING LIQUID

(75) Inventors: Richard J. Brittin, Columbia, MO (US); Daniel P. Johnston, Pierre, SD (US); Charles R. Arford, Hillsdale, PA (US)

(73) Assignee: ABJ Group, LLC, Columbia, MO (US)

( * ) Notice: Subject to any disclaimer, the term of this patent is extended or adjusted under 35 U.S.C. 154(b) by 0 days.

(21) Appl. No.: 09/376,108

(22) Filed: Aug. 17, 1999

(51) Int. Cl.⁷ .................................................. A01M 1/20
(52) U.S. Cl. .............................. 43/107; 43/122
(58) Field of Search ........................ 43/107, 122

(56) References Cited

U.S. PATENT DOCUMENTS

| | | | |
|---|---|---|---|
| 855,308 | * 5/1907 | Hansen | 43/122 |
| 983,977 | * 2/1911 | Lilge | 43/122 |
| 1,007,931 | * 11/1911 | Depner | 43/122 |
| 1,072,342 | * 9/1913 | Louviere | 43/107 |
| 4,168,591 | 9/1979 | Shaw | 43/114 |
| 4,506,473 | 3/1985 | Waters, Jr. | 43/107 |
| 4,519,776 | 5/1985 | DeYoreo et al. | 431/328 |
| 4,638,592 | 1/1987 | Schneidmiller | 43/122 |
| 4,794,724 | * 1/1989 | Peters | 43/122 |
| 4,849,216 | 7/1989 | Andersen | 424/84 |
| 4,899,485 | * 2/1990 | Schneidmiller | 43/122 |
| 5,189,830 | 3/1993 | Montemurro | 43/121 |
| 5,205,064 | 4/1993 | Nolen | 43/112 |
| 5,241,778 | 9/1993 | Price | 43/132.1 |
| 5,311,697 | * 5/1994 | Cavanaugh et al. | 43/132.1 |
| 5,382,422 | 1/1995 | Dieguez et al. | 424/45 |
| 5,540,011 | 7/1996 | Groom et al. | 43/122 |
| 5,647,164 | 7/1997 | Yates | 43/139 |
| 5,651,211 | 7/1997 | Regan et al. | 43/113 |
| 5,657,576 | 8/1997 | Nicosia | 43/132.1 |
| 5,669,176 | 9/1997 | Miller | 43/139 |
| 5,799,436 | 9/1998 | Nolen et al. | 43/112 |
| 5,813,166 | 9/1998 | Wigton et al. | 43/107 |
| 5,842,305 | * 12/1998 | Liao | 43/122 |
| 5,943,815 | * 8/1999 | Paganessi et al. | 43/107 |

* cited by examiner

Primary Examiner—Kurt Rowan
(74) Attorney, Agent, or Firm—Crompton, Seager & Tufte, LLC

(57) ABSTRACT

A trap for attracting and killing insects utilizing carbon dioxide as the attractant. The carbon dioxide is either generated, or dispersed directly into, a trapping media. This supply of carbon dioxide bubbles through the trapping media to the surface where it diffuses into the atmosphere. Subsequently, the insects are attracted directly to the trapping media, the site of the attractant's emission, where the insect subsequently lands. The trapping media then effectuates the demise of the insect by drowning the insect or by permanently affixing the insect to the trapping media.

19 Claims, 1 Drawing Sheet

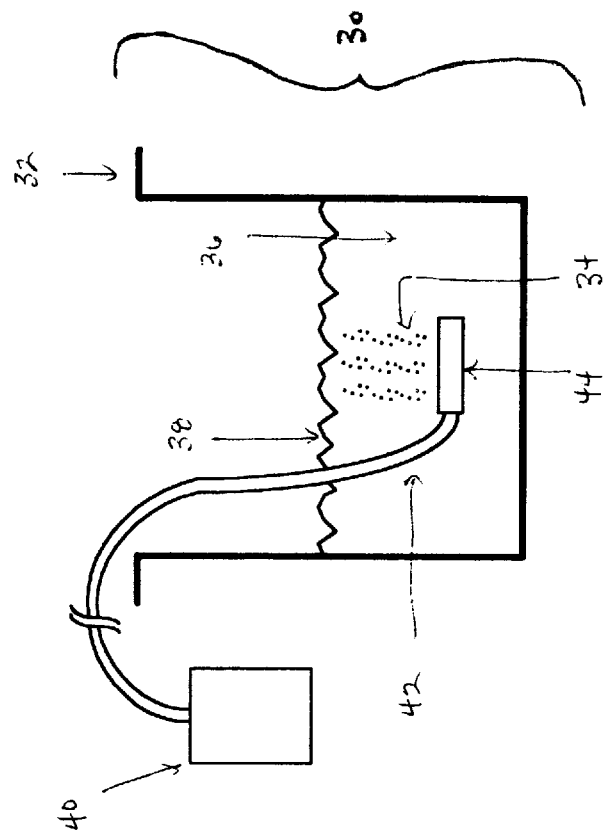
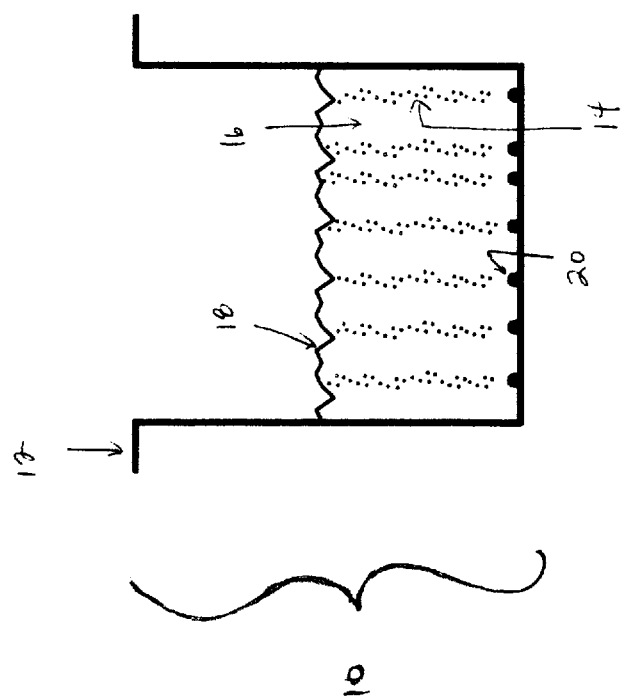
FIG. 1
FIG. 2

INSECT TRAP HAVING AN ATTRACTANT GAS EMITTED THROUGH A TRAPPING LIQUID

FIELD OF THE INVENTION

The present invention relates to an insect-trapping device using carbon dioxide as the main attractant to draw insects into a trapping liquid. The insect trap specifically focuses on, but is not limited to, the attraction and containment of mosquitoes.

BACKGROUND OF THE INVENTION

The push for "environmentally friendly" insect traps correlates with the public's increased awareness of the health and environmental effects of insecticide use. The basic principle is to attract an insect to the trap where the insect is subsequently contained or destroyed. Such traps include the electrified UV lamp (where an insect is drawn toward the lamp where it is electrified) and the "lobster pot" trap (where an insect is drawn into a container which is difficult, by design, for the insect to escape). Most variances in these "environmentally friendly" insect traps regard a modification in either the attractant or the trapping mechanism used.

Attractants vary in effectiveness and in their specificity to certain insects. The attractant most used is color. Different insects are attracted to different colors. Flies have been found to be attracted to a yellow to yellow-green hue, while mosquitoes have an affinity to a white hue. By modifying the color of the container used for the trapping mechanism, a specificity may be obtained for a certain insect.

Another productive attractant is the use of odor. Odiferous attractants usually mimic those smells associated with an insect's feeding or reproductive cycle. Therefore, such stimuli prove to be highly effective. One such odor-emitting trap exhausts an odiferous mixture resembling the decomposition of matter from within its container. Although effective, the odor emitted from such traps is often repugnant to humans making them ill suited for certain applications.

Other insects are naturally attracted to odors which are non-offensive to humans. Mosquitoes, for instance, are attracted to carbon dioxide. This non-offensive gas is emitted from the human body, as well as other natural sources. Some prior art traps are designed utilizing this attractant. One trap utilizes a separate carbon dioxide source to naturally lure insects into the container of the trap. Once inside the container, the insect is trapped by the container's design. Subsequently, the insect flies until exhausted from trying to escape the confines of the container, whereby the insect finally succumbs falling into the entrapping liquid.

SUMMARY OF THE INVENTION

The present invention uses a means for attracting an insect directly to the entrapping liquid, whereby the insect breaks the surface layer of the liquid, due to the treatment of the liquid with a surfactant, and subsequently drowns. The present invention does not rely heavily on the design of the containment vessel in trapping the insects. Rather, the present invention relies on the properties of the entrapping liquid, itself, in combination with emitting the attractant from the liquid surface, as by bubbling the attractant into the liquid or generating it within the liquid. Thus, this method of direct attraction embodied in the present invention allows for a less confining container.

The principle objective of the invention is to draw the insect immediately to the entrapping liquid where the insect meets its demise directly, either through drowning or adhesion. This objective is possible because the carbon dioxide attractant is dispensed through or generated within the entrapping liquid. Thus, the carbon dioxide is released into the atmosphere at the surface level of the entrapping liquid. Preferably, the carbon dioxide is dispersed within the liquid so that numerous small bubbles are emitted over the surface area of the liquid. Therefore, when the insect is drawn to the source of the carbon dioxide, the insect will seek out the entrapping liquid. There the insect will land and subsequently drown.

There are several methods of generating or dispensing the carbon dioxide through the entrapping liquid so as to allow for its release at the surface of the liquid. A preferred embodiment uses a chemical reaction within the entrapping liquid to generate the carbon dioxide. A further preferred embodiment uses a dispersion nozzle in connection with an exterior carbon dioxide source to dispense carbon dioxide into the entrapping liquid.

BRIEF DESCRIPTION OF THE DRAWINGS

FIG. 1 is a schematic view of a preferred trap for attracting and killing insects in accordance with the present invention; and FIG. 2 is a schematic view of a further preferred trap for attracting and killing insects in accordance with the present invention.

DETAILED DESCRIPTION OF THE PREFERRED EMBODIMENTS

Referring now to the drawings, wherein like reference numerals refer to like elements throughout the several views, FIG. 1 shows a schematic view of a preferred insect trap 10 in accordance with the present invention. The insect trap 10 may be used generally to attract and trap any insect. In particular, the trap 10 may be used to trap mosquitoes, flies, midges, and other flying insects. However, the trap 10 may also attract and trap terrestrial insects such as ants and spiders. A specificity to a particular insect may be achieved by modifying the physical attributes of the trap 10 itself, or by modifying the attractant used.

The housing of the insect trap 10 consists primarily of a container 12. This container 12 holds the trapping media 16. The container 12 may be made from a variety of materials. The materials chosen often reflect the application sought. Typically, the container 12 will be made from a plastic or glass material. The defining criteria for the container 12 is that it must be capable of holding a quantity of trapping media 16.

The container 12 may be open-ended or closed. If the container 12 is closed, it may have small apertures in the container 12 to allow the attractant to be emitted from the openings. The apertures should also be large enough to allow the selected insect to enter the container 12. These apertures may also be selective in allowing the insects to exit the container 12. Therefore, the apertures may be designed for limited egress. In preferred embodiments, however, the container 12 has a large open top so that the surface of the trapping media 16 is readily accessed by insects.

The insect trap's container 12 may comprise a variety of colors. Altering the color of the trap allows for the attracting and trapping of specific insects. Studies indicate that certain insects are initially attracted to certain hues. For instance, the mosquito is attracted to white hues while a fly is attracted to yellow to yellowish-green hues. The use of color also aids in capturing the rays of the sun in producing indirect heat that may radiate from the insect trap. Many insects are drawn to this radiating heat because the heat is an indicator of a host organism for the insect. Thus, if the container 12 radiates heat, it may be utilized as an additional attractant in luring an insect to the trap 10.

The trap container 12 may be shaped to accommodate several applications and sites for its operation. For example, the trap container 12 may be suspended off the ground by hanging, suspended off the ground by a stand, or it may be freestanding on the ground.

Inside the trap's container 12 is a quantity of trapping media 16. This trapping media 16 may be a liquid, or it may be a solid. However, if the trapping media 16 is a solid, it is preferable that the solid be gas permeable and resinous. As with the trapping liquid media 16 described below, a porous solid would allow distribution of attractant in small quantities over the entire surface. A liquid trapping media 16 is usually an aqueous solution. To this liquid, a surfactant is added. The surfactant is used to lower the surface tension of the surface layer 18 of the trapping liquid 16. Although a surfactant is preferred, any surface tension lowering chemical may be added to achieve the desired effect. The use of the surfactant allows the insect to break through the hydrogen-bonded surface layer 18. Without the surfactant, the insect is free to move along the liquid media's surface 18. Once the insect breaks through the surface layer 18, it drowns because it is unable to stabilize itself upon the broken surface of the trapping liquid 16. Preferred surfactants include dioctyl sulfosuccinate or any non-ionic, cationic, or anionic surfactant and mixtures thereof that are environmentally and toxicologically benign. A resinous solid trapping media 16 works differently. Once the insect is drawn to the solid media 16, it will become irreversibly attached to the media 16 when it contacts the media's surface 18. There, the insect will die of exhaustion from trying to free itself from the resinous solid.

An attractant 14 draws the insects to these various trapping mediums 16. In preferred embodiments, carbon dioxide is utilized as the attractant, bubbling up through the entrapment liquid 16. Other attractants, whether general or insect specific, may be used in conjunction with the $CO_2$, or alone. General attractants often consist of various sugars. Such sugars include fructose and sucrose, among others. Lactic acid is also an exceptional general attractant. Lactic acid may be used by itself, or in combination with other general or insect specific attractants. Studies have proven that mosquitoes are highly attracted to carbon dioxide, and for this reason it is preferred. It is also possible to use general and specific attractants in combination, affording a greater response by the intended insects. However, single usage may be preferred due to cost.

The attractant 14 is preferably supplied within the trapping media by one of two methods. The first method, illustrated in FIG. 1, is to generate the attractant within the trapping media 16. The second method, illustrated in FIG. 2, is to dispense or disperse the attractant inside the trapping media 36 from an outside source 40. The preferred attractant discussed will be carbon dioxide 14.

FIG. 1 illustrates the preferred embodiment for generating carbon dioxide 14 by using an acid/base reaction within the trapping media 16. In such a reaction, either the acid or the base should have a functional group which releases carbon dioxide 14 when the acid and base react. For this reason, a preferred acid is carboxylic acid. Other acids may also be used which include acetic acid, citric acid, and tartaric acid. These acids may be placed directly within the trapping media 16 of the insect trap 10. Thus, in a preferred embodiment, the acid is in solution within the trapping media 16.

Likewise, there are numerous bases which may be utilized to generate the desired reaction and production of carbon dioxide. The preferred base is a carbonate salt 20. When the carbonate salt 20 reacts with an acid such as those discussed infra, carbon dioxide is released 14. Common minerals comprising the general chemical structure of a carbonate salt 20 may also be utilized as the base component in the reaction. These common minerals include limestone, baking soda, and trona, among others.

The carbonate salt 20 may take numerous forms. Often, the form of the carbonate salt 20 is indicative of the type of reaction desired. For example, if one wishes the reaction to take place at the surface layer 18 of the trapping media 16, then a powderized form is desired. The forms that the base may take shape include pelletized, tablet, and powder, among others.

For all forms, the carbonate salt 20 may be placed into a semi-permeable container. This container allows the carbonate salt to react freely with the surrounding trapping media 16 without allowing the solid carbonate salt 20 to egress from the container. When the trapping media 16 reacts with the carbonate salt 20, carbon dioxide gas 14 is produced, whereby the gas escapes through the semi-permeable container and bubbles up to the surface of the trapping media 18. Such a semi-permeable container may also be selectively buoyant. The degree of submergence of the container may be altered by using various weights.

If the carbonate salt 20 is in the form of a dense solid (pellet or tablet), the dense carbonate salt 20 may be added directly to a liquid trapping media 16 where the dense carbonate salt 20 should sink to the bottom of the container. There, the carbonate salt 20 reacts with the acid contained within the trapping media 16, resulting in the steady production of carbon dioxide gas 14, which bubbles to the surface 18.

If the carbonate salt 20 is in a powder form, the powderized carbonate salt may be added directly to the surface layer of the trapping media 18. This form allows for an optimal reaction when using a solid trapping media 16. When the powderized carbonate salt reacts with the surface layer of the trapping media 18, carbon dioxide 14 is produced at the surface layer 18, whereby it elutes into the surrounding atmosphere.

In all of the reactions, it is preferred that the reaction not create an offensive odor to humans. By limiting the repugnancy of the odor, the applications of the trap 10 may be extended. For instance, the trap 10 may be used in close quarters with humans when the odor is non-detectable. If the reaction were to produce a repugnant odor, the applications would be limited to the outdoors and at a distance from humans. Such repugnant odors are often associated with traps 10 involving a fermentation reaction. The preferred embodiment of carbon dioxide gas production 14 does not involve a fermentation reaction. Furthermore, carbon dioxide 14 emissions are not offensive to humans, and therefore, this attractant may be utilized in both indoor and outdoor settings and in close proximity with humans.

FIG. 2 is a further preferred embodiment of an insect trap 30 which dispenses an attractant inside the trapping media 36 from an outside source 40. In this embodiment, the attractant, preferably carbon dioxide 34, is directed into the trapping media by a lumen 42 connected to the outside attractant source 40. In one preferred embodiment, the lumen 42 is placed directly within the trapping media 36. In this embodiment, the lumen 42 is often connected to a device which disperses the carbon dioxide gas 34. This dispersion results in the formation of small gas bubbles 34. Furthermore, this dispersion allows the gas bubbles 34 to be diffused along a greater surface portion within the trapping media 36 and its surface 38. An example of such a device which disperses the carbon dioxide gas 34 is a bubbling stone 44. This is a porous stone with a lumen running within. Such bubbling stones 44 may be in various shapes and sizes, and therefore, a stone may be selected to optimize the bubble production pattern in various container 32 shapes. For example, the bubbling stone 44 may be elongated, circular, or any other formation which creates the desired effect.

Another preferred embodiment for dispersing an outside attractant source is by connecting the outside source 40 to the container 32 itself. In this embodiment, the connection lumen 42 does not interact with trapping media 36 directly. Instead, the connection lumen 42 attaches to the container 32 somewhere below the surface level of the trapping media 38. Therefore, the connection to the container 32 may be made either on the container's bottom or side. From this connection site, it may also be preferred to use a bubbling stone 44 to optimize the pattern formed by the carbon dioxide gas 34.

The advantage of the dispensing mechanism embodiments is that they often do not involve a reaction of any kind within the trapping media 36. In order to ensure unwanted side reactions which may result in odor production, inert ingredients may be used within the trapping media 36. Therefore, these embodiments allow the insect trap 30 to be utilized in areas where humans will need to be in close proximity to the trap 30.

The following are a series of experiments showing the effectiveness of both general and specific attractants in conjunction with the present invention.

Experiment 1

In a preferred embodiment of the invention, 10 grams pelletized limestone ($CaCO_3$) containing a nontoxic surfactant was introduced into a white bowl with 20 grams of citric acid (2-hodroxy-1,2,3-propanetricarboxylic acid) and 500 ml water. The surfactant used was dioctyl sulfosuccinate. $CO_2$ was generated by the combination and visibly evident as bubbles emanating from the liquid surface. The bowl was placed outdoors overnight next to a control (a white bowl containing 500 ml water). The following morning the bowls were retrieved and the number of drowned mosquitoes were counted. The results were:

| | |
|---|---|
| The preferred embodiment: | 75 mosquitoes |
| Control: | 2 mosquitoes |

Experiment 2

5 grams of lactic acid ($CH_3CH(OH)COOH$) was added to the preferred embodiment in Experiment 1. The preferred embodiment was set alongside a control as described in Experiment 1. After five minutes the bowls were retrieved, and the number of drowned mosquitoes were counted. The results were:

| | |
|---|---|
| The preferred embodiment: | 5 mosquitoes |
| Control: | 0 mosquitoes |

Numerous characteristics and advantages of the invention covered by this document have been set forth in the foregoing description. It will be understood, however, that this disclosure is, in many aspects, only illustrative. Changes may be made in details, particularly in matters of shape, size, and arrangement of parts without exceeding the scope of the invention. The invention's scope is defined, of course, in the language in which the appended claims are expressed.

What is claimed is:

1. A trap for attracting and killing insects comprising:
   a container having a quantity of trapping liquid disposed therein, forming a surface layer on the liquid;
   a surfactant in the trapping liquid that lowers the surface tension on the surface layer of the trapping liquid; and
   a means for generating a flow of carbon dioxide within the trapping liquid so that the carbon dioxide bubbles to the surface layer of the trapping liquid, where it diffuses into the atmosphere and attracts the insects.

2. The insect trap of claim 1, wherein the means for generating a flow of an attractant is by a chemical reaction between an acid and a base within the trapping media, whereby the attractant bubbles to the surface layer.

3. The insect trap of claim 2, wherein the means for generating a flow of an attractant is by adding a carbonate salt to the trapping media, whereby the attractant bubbles to the surface layer.

4. The insect trap of claim 2, wherein the means for generating a flow of an attractant further includes a semipermeable container suspended within said trapping media, whereby the attractant bubbles to the surface layer.

5. The insect trap of claim 1, wherein the means for generating a flow of an attractant is by a chemical reaction occurring on the surface layer of the trapping media.

6. The insect trap of claim 1, wherein the means for generating a flow of an attractant is non-fermenting.

7. The insect trap of claim 1, wherein the trapping media is fortified with sugars to supplement as an attractant.

8. The insect trap of claim 1, wherein the trapping media is fortified with lactic acid to supplement as an attractant.

9. The insect trap of claim 1, wherein the container has a removable lid containing at least one opening allowing free movement of the attractant out of, and an insect into, the trap.

10. A trap for attracting and killing insects comprising:

a container having a quantity of trapping media disposed therein, the trapping media having a surface layer and including a surfactant disposed at said surface layer; and a means for generating a flow of carbon dioxide within the trapping media so that the attractant migrates to the surface layer, where it diffuses into the atmosphere.

11. The insect trap of claim 10, wherein the trapping media is a liquid.

12. The insect trap of claim 10, wherein the means for generating a flow of an attractant is non-fermenting.

13. The insect trap of claim 10, wherein the trapping media is fortified with sugars to supplement as an attractant.

14. The insect trap of claim 10, wherein the trapping media is fortified with lactic acid to supplement as an attractant.

15. The insect trap of claim 10, wherein the container has a removable lid containing at least one opening allowing free movement of the attractant out of, and an insect into, the trap.

16. A trap for attracting and killing insects comprising:

a container having a quantity of trapping media disposed therein, said media including a gas-permeable resin, the trapping media having a surface layer and including a surfactant disposed at said surface layer; and a means for generating a flow of an attractant within the trapping media so that the attractant migrates to the surface layer, where it diffuses into the atmosphere.

17. A trap for attracting and killing insects comprising:

a container having a quantity of trapping media disposed therein, the trapping media having a surface layer and including a surfactant disposed at said surface layer; and a means for generating a flow of an attractant by a chemical reaction between an acid and a base within the trapping media, whereby the attractant bubbles to the surface layer.

18. An insect trap comprising:

a container having a quantity of trapping liquid disposed therein, forming a surface layer on the trapping liquid;

a surfactant in the trapping liquid that lowers the surface tension on the surface layer of the trapping liquid; and a means for dispensing a flow of carbon dioxide into said trapping liquid, whereby the carbon dioxide may migrate to the surface layer where it diffuses into the atmosphere.

19. The insect trap of claim 18, wherein the means for dispensing a flow of carbon dioxide is through a lumen connecting a carbon dioxide source into the trapping liquid.

* * * * *